US009967235B2

(12) United States Patent
Ollukaren et al.

(10) Patent No.: US 9,967,235 B2
(45) Date of Patent: May 8, 2018

(54) SYSTEMS AND METHODS FOR MANAGING ADVANCED METERING INFRASTRUCTURE

(71) Applicant: Florida Power & Light Company, Juno Beach, FL (US)

(72) Inventors: Paul J. Ollukaren, Palm Beach Gardens, FL (US); Radhakrishnan Swaminathan, Jupiter, FL (US); Susan Lynn King, Stuart, FL (US); Keith Wayne McBee, Jupiter, FL (US); Julio C. Gutierrez, Miami, FL (US); Manuel Rodriguez-Perez, Miami Springs, FL (US)

(73) Assignee: Florida Power & Light Company, Juno Beach, FL (US)

( * ) Notice: Subject to any disclaimer, the term of this patent is extended or adjusted under 35 U.S.C. 154(b) by 339 days.

(21) Appl. No.: 13/676,702

(22) Filed: Nov. 14, 2012

(65) Prior Publication Data
US 2013/0145452 A1    Jun. 6, 2013

Related U.S. Application Data

(60) Provisional application No. 61/559,372, filed on Nov. 14, 2011.

(51) Int. Cl.
*G06F 9/00* (2006.01)
*H04L 29/06* (2006.01)

(52) U.S. Cl.
CPC ................ *H04L 63/0272* (2013.01)

(58) Field of Classification Search
CPC ......... H04L 63/20; H04L 63/02; H04L 69/08; H04L 63/0272; H04L 67/125;
(Continued)

(56) References Cited

U.S. PATENT DOCUMENTS 6,188,691 B1 * 2/2001 Barkai ................ H04L 12/1886
370/390
6,509,841 B1    1/2003 Colton et al.
(Continued)

FOREIGN PATENT DOCUMENTS

WO    WO 02/065360    8/2002

OTHER PUBLICATIONS

Lee, Annabelle, Smart Grid Cyber Security Strategy and Requirements, Sep. 2009, NIST, pp. 1-F-2.*
(Continued)

*Primary Examiner* — Farid Homayounmehr
*Assistant Examiner* — Lizbeth Torres-Diaz
(74) *Attorney, Agent, or Firm* — Jeffrey N. Giunta; Fleit Gibbons Gutman Bongini & Bianco P.L.

(57) ABSTRACT

A system for maintaining and hosting an AMI command and control application is disclosed. The system includes an AMI command and control application module in a network compartment for measuring energy usage from customer meters, managing an AMI network, and executing connect/disconnect orders; and a plurality of firewalls to provide a security perimeter to the AMI command and control application module when the module is accessed by a vendor network or a utility network. The AMI command and control application module includes a VPN concentrator and a 6in4 router to provide a security perimeter between the AMI command and control application module and the AMI network.

18 Claims, 14 Drawing Sheets

(58) Field of Classification Search
CPC ............. H04L 12/4633; H04L 12/2818; Y04S 40/162; G01D 4/002; Y02B 90/242; Y02B 90/246; Y02B 90/241; Y02B 90/244; G06F 11/1448; G06F 11/1458; G06F 11/1464; G06F 11/2023; G06F 11/2089; G06F 17/30082; G06F 3/067
USPC ................. 370/356, 401, 11, 14, 15, 6, 230, 370/217–229
See application file for complete search history.

(56) References Cited

U.S. PATENT DOCUMENTS

| | | | |
|---|---|---|---|
| 6,557,037 B1* | 4/2003 | Provino | H04L 29/06 709/225 |
| 6,751,562 B1 | 6/2004 | Blackett et al. | |
| 6,772,226 B1* | 8/2004 | Bommareddy | H04L 12/4641 709/230 |
| 7,185,131 B2 | 2/2007 | Leach | |
| 7,644,171 B2 | 1/2010 | Sturniolo et al. | |
| 7,734,380 B2 | 6/2010 | Ransom et al. | |
| 7,765,035 B2 | 7/2010 | Rodgers | |
| 8,375,421 B1* | 2/2013 | Shigapov | H04L 12/1818 726/4 |
| 2001/0014912 A1* | 8/2001 | Segal | H04L 63/0218 709/223 |
| 2001/0039537 A1 | 11/2001 | Carpenter et al. | |
| 2004/0264465 A1 | 12/2004 | Dunk | |
| 2005/0039040 A1* | 2/2005 | Ransom | G01R 22/066 726/6 |
| 2006/0256729 A1* | 11/2006 | Chen | H04L 63/1408 370/250 |
| 2008/0074284 A1 | 3/2008 | Edwards et al. | |
| 2008/0186203 A1* | 8/2008 | Vaswani | G01D 4/004 340/870.11 |
| 2008/0187001 A1 | 8/2008 | Vaswani et al. | |
| 2008/0219239 A1* | 9/2008 | Bell | H04L 12/4625 370/351 |
| 2009/0126002 A1* | 5/2009 | Vail | H04L 63/0209 726/12 |
| 2009/0138099 A1* | 5/2009 | Veillette | G08C 17/02 700/22 |
| 2009/0243869 A1 | 10/2009 | Sanderford, Jr. | |
| 2010/0030810 A1* | 2/2010 | Marr | G06F 17/30241 709/217 |
| 2010/0074176 A1 | 3/2010 | Flammer, III et al. | |
| 2010/0157838 A1 | 6/2010 | Vaswani et al. | |
| 2011/0035510 A1 | 2/2011 | Alexander | |
| 2011/0255548 A1* | 10/2011 | Johnson | G01D 4/004 370/401 |
| 2011/0270711 A1* | 11/2011 | Kusterer | G06Q 30/04 705/27.1 |
| 2012/0243416 A1* | 9/2012 | Hussain | H02J 13/0024 370/241 |
| 2012/0250864 A1* | 10/2012 | Nishibayashi | H04Q 9/00 380/278 |

OTHER PUBLICATIONS

Andrew K. Wright, Paul Kalv and Rodrick Sibery; "Interoperability and Security for Converged Smart Grid Network;" Grid-Interop Forum; 2010; pp. 1-11.
"UtilityAMI AMI-Enterprise System Requirements Specification;" UtilityAMI AMI-ENT Task Force; 2009; pp. 1-58.
"Security Profile for Advanced Metering Infrastructure;" The SG Security Working Group (UCAIug) & The NIST Cyber Security Coordination Task Group; 2009; pp. 1-149.
Marc W. Goldsmith, Kenneth Horne, Jason Hanna, Rich Simons and Karen Hamilton from March Goldsmith & Associates LLC; "Smart Grid Technology Options;" ConnSMART; MGA Critical Thinking for Leadership; 2010; pp. 1-102.
"Smart Grid;" Kalkitech; 2011; http://www.kalkitech.com/solutions/smart-grid.
James Ketchlegde; "Enhancing Outage Management with AMI;" Enspiria Solutions; Electric Light & Power; 2011; http://www.elp.com/articles/powergrid_international/print/volume-13/issue-2/features/enhancing-outage-management-with-ami.html.

* cited by examiner

| Utility-Hosted, Vendor-Managed AMI Cmd & Ctrl – Data Connection Requirements and Network |  |  |
|---|---|---|
| Link | Technology |  |
| Administration | Ethernet (IPv4 only) |  |
| Backhaul | Ethernet (IPv4 only) |  |
| IPV4 Firewall | Cisco ASA 5520 |  |
| IPV6 Firewall | Open BSD 4x– The IPv6 firewall is based on OpenBSD's Packet Filter (pf). |  |
| IPseal PFC28937206 concentrator | Cisco 7206 Router |  |
| Telco Circuit to Mesh | Varies, typically GigE, DS3, etc. from wirelesscarriers |  |
| Core C3750 Router | Cisco 3750G Router |  |
| Edge C2960 Access Switch | Cisco 2960 Switch |  |

FIG.11A

| Component Analysis | |
|---|---|
| Primary Purpose | Bandwith Requirements |
| VPN to Vendor for administration & maintenance (Primary path) | 10Mbps |
| Back-office integration (Cmd & Ctrl to MDMS, etc.) | 100Mbps |
| Provides IPv4 Firewalling for compartments that connect to Customer Network | Significant, as Database Traffic from the Application Server to the Database needs to proceed through this component – on the order of 300 Megabits'/second – depending on Traffic/security constraints, the database/Applications compartment may be collapsed into a single compartment. |
| Provides IPv6 Firewalling compartments that connect to NAN | 16Kbps per AP (95th %ile) + DNS Overhead |
| Concentrate IPsec and PFC2893 Tunnels | |
| Meter data/ NAN connection | 25 Kbits/second peak, 16 Kbits/second @ 95th percentile. |
| Core Router for Customer Compartment | Line Rate Router – no bandwidth requirements |
| Access Switch to connect servers | Line Rate Switch – no bandwidth requirements |

FIG. 11B

| Security Considerations |
|---|
| Must permit IPv4 ESP (for IPSec VPN to Vendor). |
| Direct LAN interconnect, typically firewall-to-firewall. |
| The IPv4 Firewall segments each compartment from another. Any attack which comprimises a UI server should not immediately result in privilege escalation to other compartments, such as the Database, which requires mediation by the Application Server |
| The NAN (Neighborhood Area Network) is able to inject traffic directly into the IPv6 compartment, as such, it is critical that policy control take place. The Cisco ASA5520 has issues with their IPv6 support in Failover mode (The failover device will blackhole traffic) The technology selected is the OpenBSD PF Firewall. |
| The 7206 is responsible for filtering traffic from and to the NAN to ensure only authorized hosts are allowed to communicate outwards |
| Varies per carrier, but typically a private network among the AP's and this private wireline backhaul circuit |
| The C3750 Trunks and Defines Vlans, and management of those VLANs is a security consideration. There is no routing policy that restricts traffic on the Core C3750 Router – that is the responsibility of the IPv4, IPv6 Firewalls. |
| The Access switches segment traffic based on VLANs and management of those VLANs is a security consideration |

FIG.11C

SYSTEMS AND METHODS FOR MANAGING ADVANCED METERING INFRASTRUCTURE

BACKGROUND OF THE INVENTION

Embodiments of the present invention generally relate to advanced metering infrastructure (AMI) used in electricity meters, gas meters, water meters and the like, and more particularly, the present invention relates to methods and systems related to an AMI command and control management application module and system.

Electricity generated at a power station may be produced using a plurality of energy sources, such as coal powered power stations, nuclear fission, hydroelectric stations, wind farms, solar photovoltaic cells, etc. This power generated at the power station is transmitted to users over a transmission grid. In recent years advancements have been made in transmission of power to an end user. One such advancement has been in the area of electrical power meters.

An electrical power meter may be implemented as an automatic meter reader (AMR) where the electricity usage is communicated one way to a meter reader. More recently, AMI has been developed. AMI differs from traditional AMR in that it enables two-way communications with the meter. AMI may receive data from the electric meter and communicate it over a network to a remote location. Also, AMI may send data to electric meters to perform various tasks.

Meter manufacturers sell meters to generate revenue. Some revenue is generated from metering system sales, but these systems are generally viewed as just another mechanism for selling additional meters. Meter manufacturers compete by providing better metering capabilities and functionality at a lower price.

Any given type of meter, whether it is water, electric, energy, or gas, measures a bounded set of quantities. These quantities represent the raw data collected by the device. Meter manufacturers were not able to use this raw metered data as a way to differentiate themselves from their competitors. Therefore, at the factory, meter manufactures conventionally loaded their meter's firmware with embedded capabilities, improved accuracy, or other applications (e.g., time of use (TOU), power quality (PQ) and/or alarm monitoring). These firmware applications use the meter's core set of data to compute the information that their meter data users (MDUs) need. Meter data users (such as utility distribution companies (UDC), energy service providers (ESP), or meter data management agencies (MDMA), etc.) used to purchase, at a low price, fully capable meters with all or some of their capabilities disabled (i.e., "turned off"). When additional functionality was needed, the MDU then purchased a license (or "key") that gave it the ability to enable ("turn on") the desired function in a meter. This method of selectively turning on meter functions allowed the meter manufacturer to create new license-based pricing models to make its product more cost competitive. Thus, in reality, the meter was still manufactured with all of the necessary hardware and applications in order to support the fullest possible range of functionality in an effort to more efficiently address possible future metering needs.

There are known drawbacks to that conventional metering approach, namely, increased functionality in the meter requires an increase in processing power and a commensurate increase in cost; the memory available "under the glass" in a meter is finite (i.e., in order to add an option one must remove another option or increase the memory); to upgrade or re-program a meter required a meter technician to drive to the meter location, physically remove the meter (or switch it out with a replacement meter) and then return it to the "meter shop" where the meter can be upgraded, and after the upgrade is complete, the meter was to be returned and re-installed; different meters require different interfaces and different communications protocols for retrieving data; increased application complexity in the firmware of the meter led to a higher probability of errors that may require upgrades; increased application functionality housed in the firmware of the meter typically requires complex configuration or programming of the end-device, which greatly increased the system management, coordination, and synchronization; and meter inventory must be increased in order to accommodate different configurations, functionalities, and versions of metering devices.

With the advent of improved communication technology, manufacturers are now able to add modem, network, and radio-frequency (RF) connectivity to their meters, thus permitting remote communications between meters and various meter data retrieval systems (e.g., automated meter reading (AMR) systems). However, there are limitations associated with these methods of remote communications: wireless communication with the meter is often limited to off peak hours determined by the various network providers; satellite-based communications are limited to line of sight communication between the meter and the satellite, thus limiting the times when the meter may be contacted; wireless and orbital satellite networks are costly, often billing per byte of data transmitted, thus limiting the amount of data which can effectively be transmitted.

Existing AMR/AMI systems are also limited in that they require several layers of applications and interfaces in order to communicate with connected meters. These layers implement the various communications protocols used by the numerous meter manufacturers and the various communications technologies that can be used to communicate with a meter (e.g., RF communication, satellite-based communication, etc.). As these meters are constantly revised, so are their communications protocols, requiring similar modifications to the AMR/AMI system. Industry standards intended to unify the communication and device protocols typically fall short by setting minimum requirements for compliance and/or providing manufacturer-specific mechanisms to allow variability and customizations. Therefore, AMR/AMI systems still often require meter-specific knowledge (e.g., communications and device protocols) to read the required data from meters offered by different manufacturers. Even with the current metering standards, the addition of a new or different meter would typically require additions and/or modifications to an AMR/AMI system. The increasing variety of meters presents an almost insurmountable challenge to the automated meter reading industry.

Deregulation of the electricity metering industry has created even more challenges. Prior to deregulation, a utility was responsible for generating, distributing, and transmitting electricity as well as purchasing, storing and installing metering devices, collecting metered data and processing customer billing. Now, with deregulation implemented throughout the United States, those duties and responsibilities that were the exclusive responsibility of the utility is now being divided among several service companies and providers who all need access to the meter and the meter data. All of these companies require access to either the data collected from the metering devices (e.g., power quality, outage, etc.) or to the calculated/processed data (e.g., quadrant data; validated, estimated, and edited (VEE) data, etc.) for their internal use (load management and monitoring, forecasting, etc.).

Today there are two prevailing AMR/AMI System business models: the exclusive ownership model (depicted in FIG. 1), and the service bureau model (depicted in FIG. 2). Certain AMR/AMI System deployments utilize a mixture of these two models in order to establish a workable business case. FIG. 1 depicts the exclusive ownership business model and shows two scenarios for AMR/AMI Systems that utilize public communication networks and private communication networks, or so-called fixed networks.

FIG. 2 depicts the service bureau business model and shows two scenarios for AMR/AMI Systems that utilize public communication networks and private communication networks.

A key difference between the public and private type communication networks is that the private network requires additional up-front cost to deploy the infrastructure of the fixed network to blanket one or more service areas. Although FIGS. 1 and 2 separate the public and private communications, AMR/AMI Systems exist that can utilize a combination or mix between public communication networks and private communication networks. In the exclusive owner business model (FIG. 1), the meter data users (MDUs) (i.e., ESPs, UDCs, MDMAs, etc.) purchase an AMR/AMI system with a significant up-front cost. In that business model, a particular MDU that is purchasing an AMR/AMI System is typically only interested in how the purchased AMR/AMI System will address its specific needs as identified in its business case. The MDU typically develops a business case that justifies the initial AMR System cost based on both measurable and non-measurable benefits. Some of the measurable benefits include: meter reading staff and infrastructure reductions, cost reductions for hard-to-access meter reading, connect/disconnect staff reductions, accurate and timely outage restoration, reduction in theft or tampering. Some of the non-measurable benefits include: faster and more frequent meter readings, thus yielding a higher level of customer service/retention, better positioned for competition in a deregulated energy market, ability to provide other types of services (i.e., new rates, flexible billing, etc.), other future uses for the metered information.

Taken alone, the measurable benefits listed above typically may not justify the expense incurred by purchasing an AMR/AMI system. Consequently, the number of large AMR System deployments has not reached expectations.

In the service bureau business model (FIG. 2), a service bureau (e.g., an MDMA, (hereinafter also referred to as a "vendor") such as Silver Spring Networks) purchases an AMR/AMI system with a significant up-front cost, and then provides access to the collected meter data to subscriber MDUs, such as a utility company. This business case is built on the value of the metered information. It assumes the service bureau will recoup the cost of the AMR system by selling meter reads or metered information to multiple MDUs (ESPs, UDCs, etc.). From the perspective of the MDU, many of the quantifiable and non-quantifiable benefits discussed above can be met using this model, with timely access to the correct set of metered information. In this model, the MDUs do not own and operate the AMR System, which is the responsibility of the service bureau operator. In this model, the MDUs pay for the information they require. This reduces the up-front costs for the MDUs over purchasing their own AMR/AMI System and provides them with the option of a pay-per-use model. The service bureau model could create some conflicts, or perceived conflicts, when competing MDUs utilize the same service bureau for metered information. In the service bureau model, the MDUs need to be able to add value by developing or buying applications that allow them to differentiate themselves from their competitors.

After the second business model becomes operational, a utility may have an interest in implementing in-house system capabilities offered by the MDMA. A utility may develop an interest in internally running an AMI application currently maintained by an MDMA or vendor. The interest may stem from national security concerns, as the MDMA system may have the capability to disconnect meters or power to commercial or private utility customers. However, one problem of implementing such system in-house is that once the MDMA system has been implemented in a particular manner, applying a set of open standards or an MDMA-specific set of configurations, it may become cost-prohibitive to move such application to the utility. For example, it could take years to retrofit a system so that it can be made compatible with enterprise software that is run by the particular utility. The present invention solves those problems.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In accordance with one embodiment, a system is provided that creates a compartment to maintain and host an AMI command and control management application and system at a utility facility, for example. The AMI command and control management application module may be an existing vendor application that measures, collects and analyzes energy usage, improves communications with customers, and manages the AMI network and devices. One goal of the invention is to retrofit such existing application so that it can be run in-house by a utility, for example. In one embodiment this AMI application is an extension of the AMI network and is considered the head-end of the AMI network. In one aspect of the invention, the application is hosted using an appliance approach. In another aspect of the invention, the application is implemented in a network compartment with a physical and logical security perimeter between the utility network and a vendor network. In yet another aspect of the invention, the network layers 2 and 3 are implemented such that changes made to an AMI network being run by a vendor can be made compatible with the application as hosted internally without further modifications to the application code.

In one embodiment, the AMI command and control management application module may implement a number of functions. For example, the module may run a meter manager application that automates the process of collecting meter data by enabling continuous connectivity with meters, which in turn enables the AMI to improve energy efficiency, increase the accuracy of the utility's customer billing, support remote disconnect and reconnect services, and improve outage detection and isolation. The module may run an application that provides alerts about meter locations where voltage levels drop below preset thresholds. The module may also run an outage detection application to ascertain the time, type, and location of outages.

These features and advantages of the present invention will become more readily apparent from the attached drawings and description of illustrative embodiments, which follow.

BRIEF DESCRIPTION OF THE DRAWINGS

The drawings, in which like numerals represent similar parts, illustrate generally, by way of example, but not by way of limitation, various embodiments discussed in the present document.

FIGS. 11A-D show partial views of a table with data connection requirements and network components in accordance with one embodiment.

DETAILED DESCRIPTION OF ILLUSTRATIVE EMBODIMENTS

The following detailed description of certain embodiments of the subject matter set forth herein, will be better understood when read in conjunction with the appended drawings. As used herein, an element or step recited in the singular and proceeded with the word "a" or "an" should be understood as not excluding plural of said elements or steps, unless such exclusion is explicitly stated. In this document, the term "or" is used to refer to a nonexclusive or, unless otherwise indicated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense, and the scope of the subject matter disclosed herein is defined by the appended claims and their equivalents. In the description that follows, like numerals or reference designators will be used to refer to like parts or elements throughout.

Figure 1:
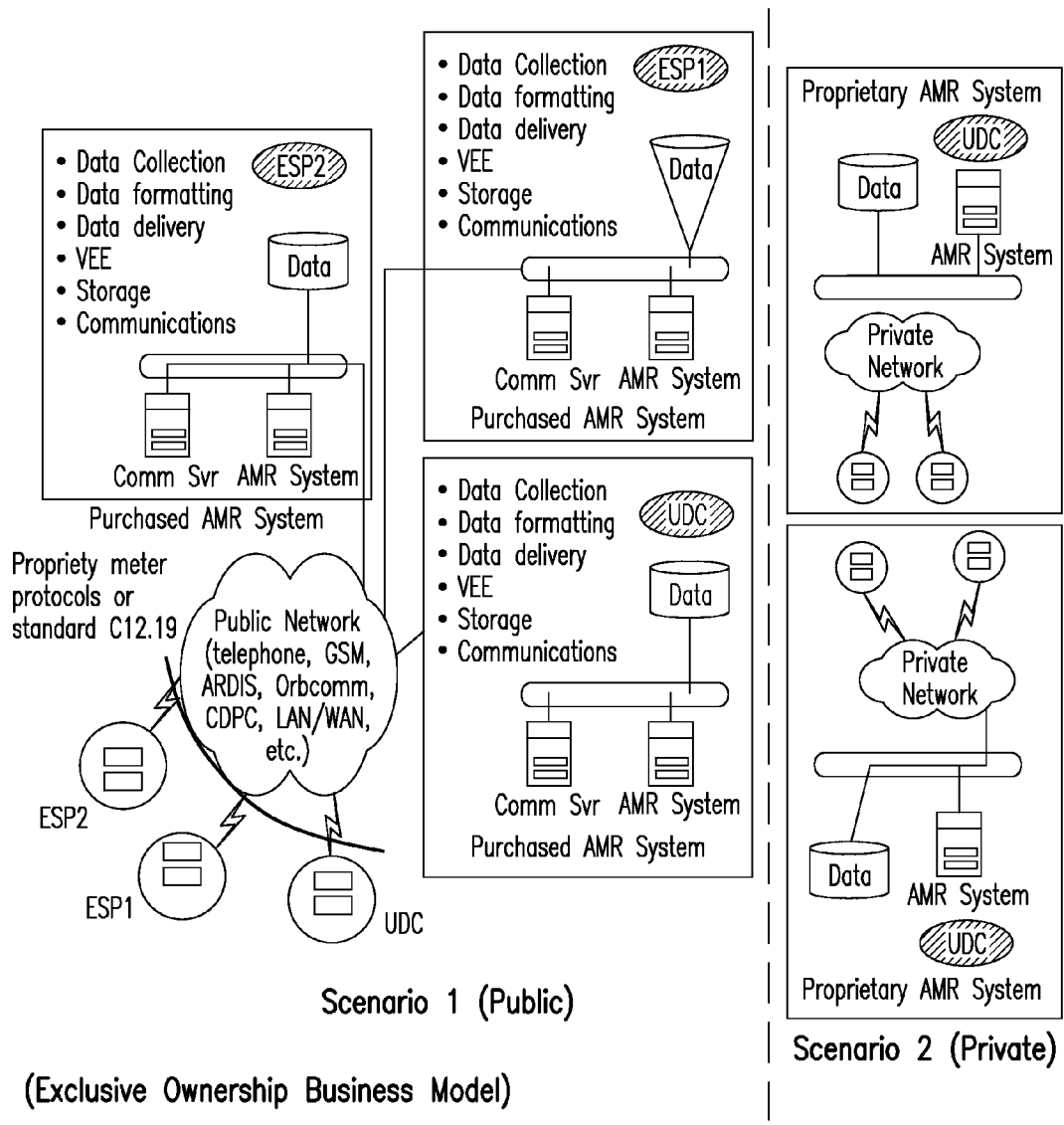
FIG. 1 schematically depicts an AMI system exclusively run or maintained by a utility company.
Figure 2:
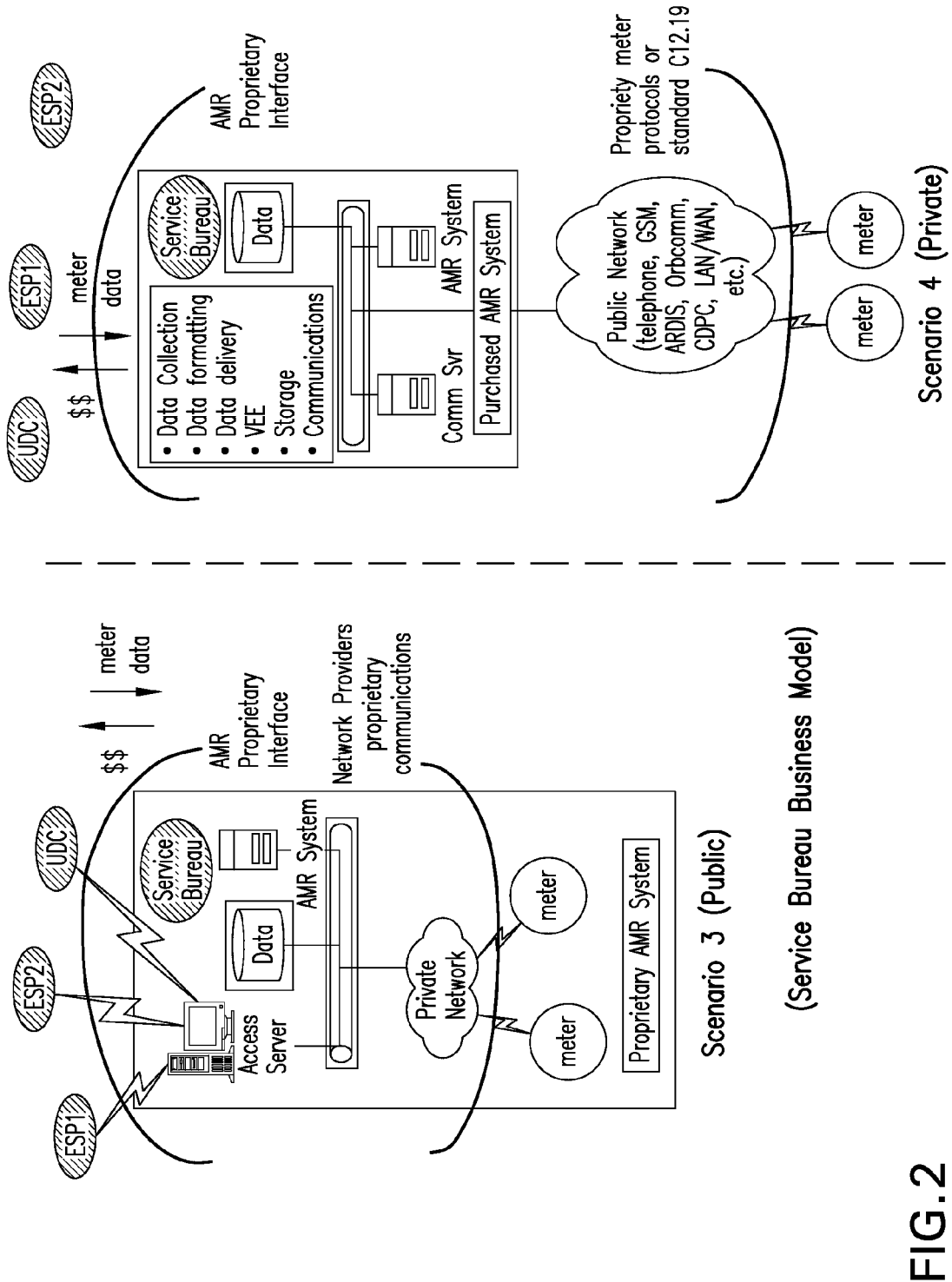
FIG. 2 schematically depicts an AMI system run or maintained by a vendor.
Figure 3:
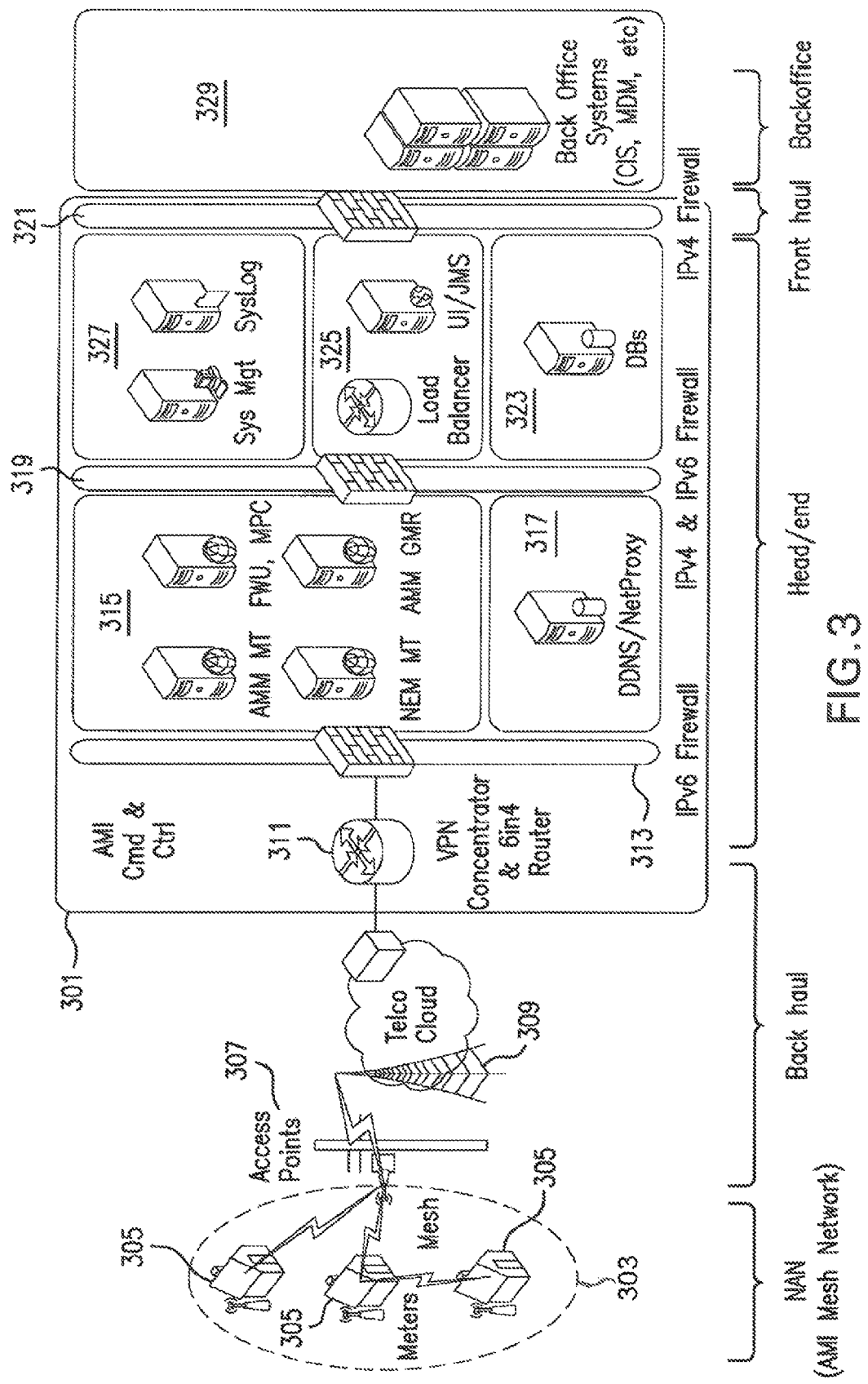
FIG. 3 illustrates a conventional AMI Network together with the AMI command and control management application of the present invention, in accordance with one embodiment.

FIG. 3 illustrates a conventional AMI Network together with the AMI command and control management application module 301 of the present invention. In one embodiment, the AMI command and control management application module may implement a number of functions. For example, the module may run a meter manager application that automates the process of collecting meter data by enabling continuous connectivity with meters, which in turn enables the AMI to improve energy efficiency, increase the accuracy of the utility's customer billing, support remote disconnect and reconnect services, and improve outage detection and isolation. The module may run an application that provides alerts about meter locations where voltage levels drop below preset thresholds. The module may also run an outage detection application to ascertain the time, type, and location of outages.

In one embodiment, AMI management application components are segregated into network compartments maintained by the vendor based on their commutations and protocols requirements. Vendor components may fall into 2 categories; those that communicate with the AMI meters using Internet protocol v6 (IPv6) (IPv6 Services) and those that communicate with backend systems/users (IPv4 Services). These service groups and their respective network compartments are separated by firewalls, ensuring that only components that need to communicate to the meters are allowed to do so or that back offices systems/users are not allowed to directly communicate with meters. The segregated network compartment design provides a foundation for network security and drives the need for multiple IPv4 and IPv6 firewalls.

Communications from AMI management applications to the meter and vice versa rely on IPv6. IPv6 provides the expanded network addressing space needed for large networks such as an AMI network. However, to reduce costs/complexity, a person of ordinary skill may want to use commercial networks that do not support IPv6, such as public cellular networks or MPLS. To get IPv6 packets to/from the meters through an IPv4 network, the AMI management application relies on 6in4 tunneling as defined on RFC2893 (see www.ietf.org/rfc/rfc2893.txt). 6in4 uses VPN tunneling to encapsulate IPv6 traffic over explicitly-configured IPv4 links. The use of 6in4 requires that a VPN concentrator 311 be deployed as part of the AMI management application network integrating the vendor AMI management application in between the backhaul and the IPv6 services. This VPN concentrator is a major component of the AMI management application design as it provides the link between AMI management applications and the AMI mesh network 303.

The system of FIG. 3 includes meters 305, which are interconnected through an AMI mesh network 303. In one embodiment, the network may be implemented as a near-me area network (NAN). The system of FIG. 3 also includes access points (APs) 307 that serve as an interface between the network 303 and the telecommunications carrier network 309. Command and control command and meter data can be exchanged between the meters and the AMI command and control management application module 301 through communications links established by use of the network 303, APs 307 and the telecommunications carrier network 309.

The AMI command and control management application module is maintained at the utility's facility. Incoming data transmissions from the meters 305 are received by a VPN concentrator and a 6in4 router (311) in accordance with one embodiment and passed through an IPv6 firewall 313. The DDNS server may assign a new IP address to incoming meter data packets in accordance with the IPv4 protocol. For example, because of the large number of meters handled by the AMI command and control management application module, a large number of addresses supported by IPv6 may be used to create new corresponding addresses using IPv4. FIG. 3 illustrates a Virtual Area Network (VLAN) 315. In one embodiment, components that require IPv6 connection to field devices are hosted in the VLAN 315. The AMM MT (Advanced Metering Manager Middle Tier) accepts commands from users and places them in a queue. AMM GMR (Generic Meter Reader) receives these requests and sends them to the meters for execution. The Firmware Updater (FWU) and Meter Program Configurator (MPC) directly update the software and configuration settings on the meter. The Network Element Manager (NEM) collects statistics regarding the network operation of each end point.

After data is processed by modules 317 and 315, the meter data is passed through another firewall 319. Module 327 may include a logging tool to provide centralized message aggregation, form hierarchical message capture, and form data storage systems (DBs 323). Data needed to initiate register reads and export register values to module 329, for example, to Meter Data management system (MDM) through firewall 321, may be loaded in DBs 323. FIG. 3 also illustrates a load balancer (for server assignment) and a user interface (UI) module that enables the interaction between persons using the AMI management application and the application.

The requirements for specific networking devices highlight the importance of networking to an AMI management applications deployment. FIG. 3 shows illustrative components of the AMI management application (head end) solution and their "network" relationship to other components, the AMI mesh network, the backhaul and the back office systems.

Figure 4:
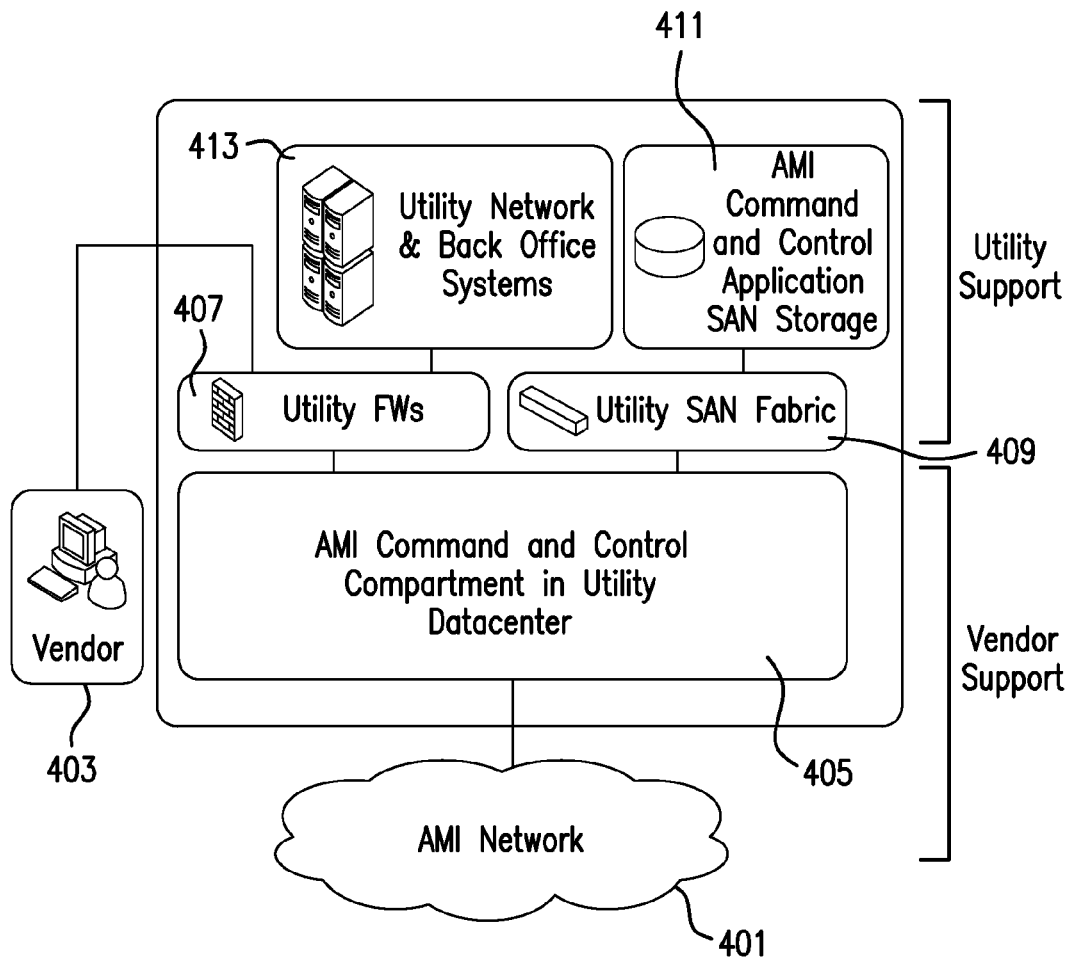
FIG. 4 illustrates one embodiment of the present invention whereby the AMI command and control management application is hosted by a utility in a network compartment.

FIG. 4 illustrates one embodiment of the present invention whereby the AMI command and control management application is hosted by a utility in a network compartment. The AMI command and control management application is the brains and an extension of the AMI network; therefore it is fundamentally different than traditional applications on a general purpose network. The AMI command and control management application may comprise a suite of applications and a set of specific infrastructure requirements. Both are highly integrated for the purpose of managing and collecting data from million of meters. Infrastructure requirements include specific network topologies, specific protocols and RFCs, and prescribed third party products. Vendors have developed an AMI management application designs based on these requirements for the vendor's internal hosting practice. While the infrastructure requirements are based on industry standards generally available in many products, the design specifies the products and a configuration that maybe certified to meet business needs of the vendor. Consequently, the operating risk of retrofitting to other products or IT standards into the AMI management applications of the present invention far outweighs the risk of the utility learning to use the products specified in the vendor design. Additionally, time frame limitations would make retrofitting other products even more risky. Therefore, the present invention hosts a vendor "packaged solution" so that the utility design is kept close to the vendor specified design as possible. This model has its roots in the "appliance" model, the functionality and SLA is met by the AMI management application compartment, and thus the utility does not need to specify or control the configuration within the system. In accordance with the present invention the vendor may still configure and manage components and egresses of AMI management applications (except power and cooling, for example).

There are at least three more aspects with respect to the business model where the vendor configures and manages the AMI management application hosted by the utility. First, the utility establishes compliance and security controls due to the criticality and visibility of this system. The utility may choose to control and manage some of the egresses to AMI management applications by creating a physical and logical security perimeter between AMI management applications and the vendor and utility networks. Secondly, the utility may choose to leverage existing corporate IT assets to reduce long run AMI management application costs and/or make AMI management applications independent from the vendor infrastructure. For instance, the existing utility corporate Storage Area Network (SAN) could used to provide server storage as opposed to deploying a new SAN. Also, existing utility compliance tools may be leveraged where it makes sense. Thirdly, and most importantly, utility products may be built on open source technologies that do not readily integrate with the utility's enterprise hosting solutions and tools. While the utility may integrate with the AMI management applications suite with "standard" enterprise platforms/infrastructure or retrofitting the applications, this may result in an unacceptable solution either due to the long run integration risks, time to market issues, and/or cost. Additionally, the present invention includes a design of AMI management applications with a "share nothing" approach to better support SLAs, capacity management, and issue resolution. The AMI command and control management application may have its own network egresses, its own SAN devices (within the shared corporate SAN), its own admin link to the vendor, and its own disaster recovery WAN link.

FIG. 4 illustrates a high level view of the system 400 of the present invention, including the AMI network 401, a vendor location 403, and modules 405, 413 and 411 being run at the utility facility. While the AMI command and control management application module 405 is run at the utility in a network compartment, the vendor 403 may still access and remotely maintain the application 405. The vendor connection is subject to the utility's firewall systems 407. The module 405 accesses storage 411 through SAN Fabric 409 and accesses back office applications, such as MDM, through firewall 407.

Figure 5:
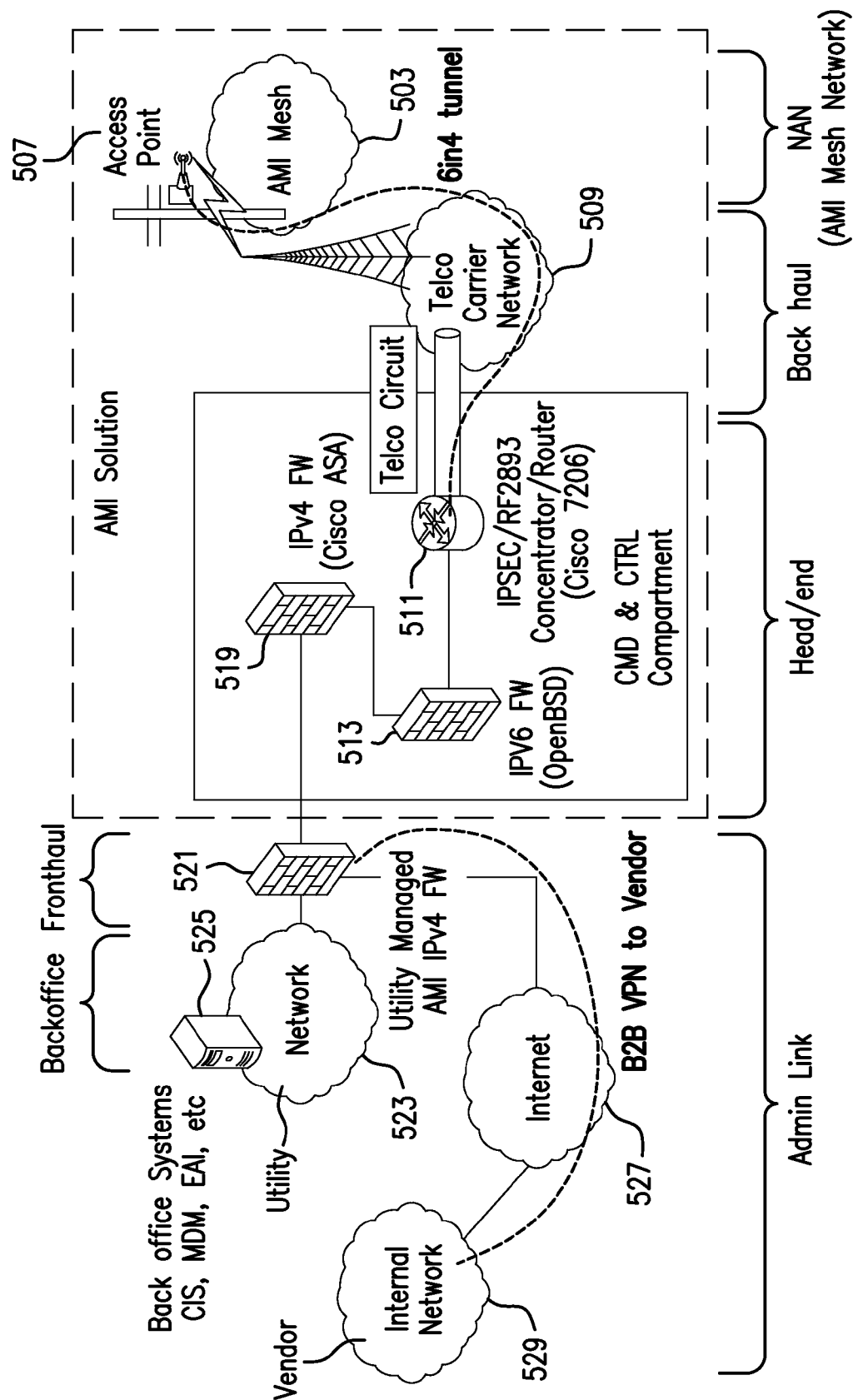
FIG. 5 illustrates a high-level diagram of the system of the present invention, in accordance with one embodiment.

A high-level diagram of the system of the present invention is shown in FIG. 5. As discussed, the AMI management application includes specific networking components such as IPv6 FWs and 6in4 routers/VPN concentrators.

In one embodiment the AMI system and the AMI management application compartment is bordered by a pair of utility managed Nokia Checkpoint firewalls (FWs) which segregate the compartment from the utility network and vendor administration endpoints. The FWs are setup in an active/passive HW cluster. This architecture allows utility to bring redundant paths to/from the solution and secure the solution by providing a choke point for application and admin traffic. The vendor gains access to the AMI management application compartment and the system as a whole through the "admin link", an L2L B2B IPSEC VPN over the Internet that is established from an IPv4 FW at the vendor location to the utility Nokia FWs. Utility user and back office application traffic flows into compartment through the "fronthaul", a physical link between the utility corporate Enterprise network and the Nokia FWs. Therefore, the Nokia FWs have three physical interfaces, 1) a connection to the utility corporate enterprise network, 2) a connection to the Internet, and 3) a connection to the AMI management application compartment. The protocols and ports allowed into the AMI management application compartment are controlled at the Nokia FWs by utility.

The connections to the AMI mesh network, e.g., Telco circuits, may be part of the AMI solution and may therefore be controlled by vendor. The control points may be defined by what part of the solution is and what is not. FIG. 5 shows the vendor and utility networking components in relation to the end-to-end AMI system.

FIG. 5 illustrates a high-level diagram of the system of the present invention, in accordance with one embodiment. The system of FIG. 3 includes meters in an AMI mesh network 503 connected to AP 507. The AP serves as an interface between the meters and the AMI command and control management application module of the present invention, which is illustrated in FIG. 5 as a command and control compartment. The connection between the AP and the command and control compartment may be established through use of a 6in4 tunnel implemented over the telecommunications carrier 509. Similar to the embodiment described with respect to FIG. 3, the command and control compartment includes a concentrator/router and a number of FWs. In the illustrated embodiment, the concentrator/router 511 is a Cisco 7206 router that handles the IPv6 over IPv4 per RFC 2893, for example. The IPv6 FW 513 may be implemented through use of the OpenBSD while the IPv4 FW 519 may be implemented through use of Cisco ASA security firewall. Although the utility runs the AMI command and control management application in its facilities, the vendor 529 may still maintain and access the application by establishing a connection with the application module through the Internet 527 over a B2B VPN connection. The utility may also access and maintain the AMI command and control management application module by establishing a connection with the application module through a private network 523. Both the vendor connection and the utility connection are established through use of the FW 521.

Figure 6:
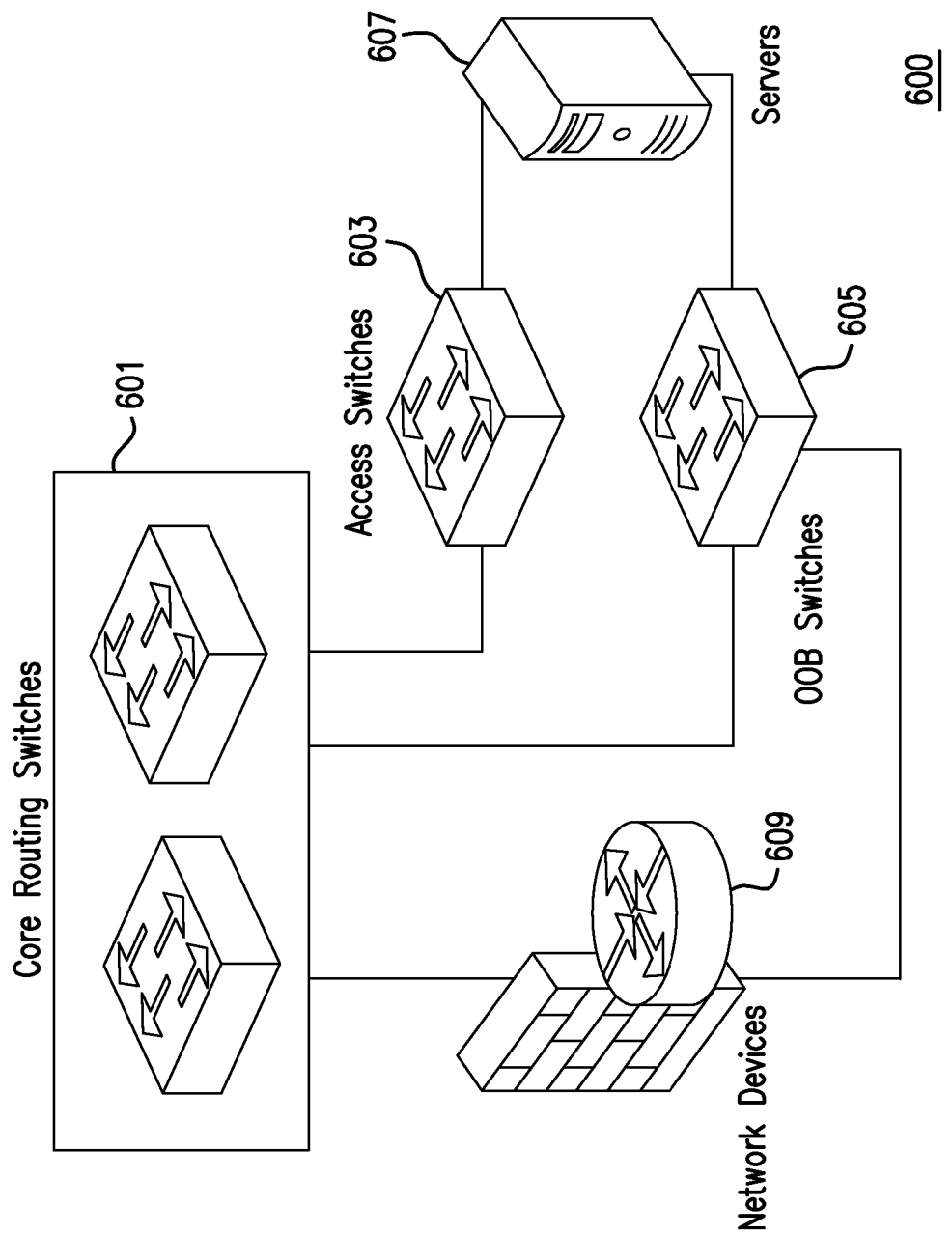
FIG. 6 shows the relationship between core routing switches, edge switches, and compartment devices, in accordance with one embodiment.

FIG. 6 shows the relationship between core routing switches, edge switches, and compartment devices, in accordance with one embodiment. In one embodiment, core routing within the compartment may be controlled by a pair of Cisco 3750 switches 601. These switches may also define and control the Virtual Local Area Networks (VLANs) that define the various network segments. Servers connect to Cisco 2960 edge switches which in turn uplink to the Cisco 3750. The Cisco 2960 edge switches may be categorized into two types; access switches 603 and out-of-band (OOB) switches 605. Access switches 603 provide in-band server 607 primary network connections. The OOB switches 605 provide secondary management connections for devices. Separating the in-band and OOB traffic ensures that devices can be managed if there is a problem with the in-band connection. For some network devices 609 the in-band connection goes directly to core routing switches. Layer 2 and layer 3 are adapted to create a security perimeter between the utility and vendor networks.

FIGS. 11A-D illustrate partial views of a table with specifications to a utility-hosted, vendor-managed AMI application compartment. Specifically, the table illustrates data connection requirements and network components in accordance with one embodiment.

Figure 7:
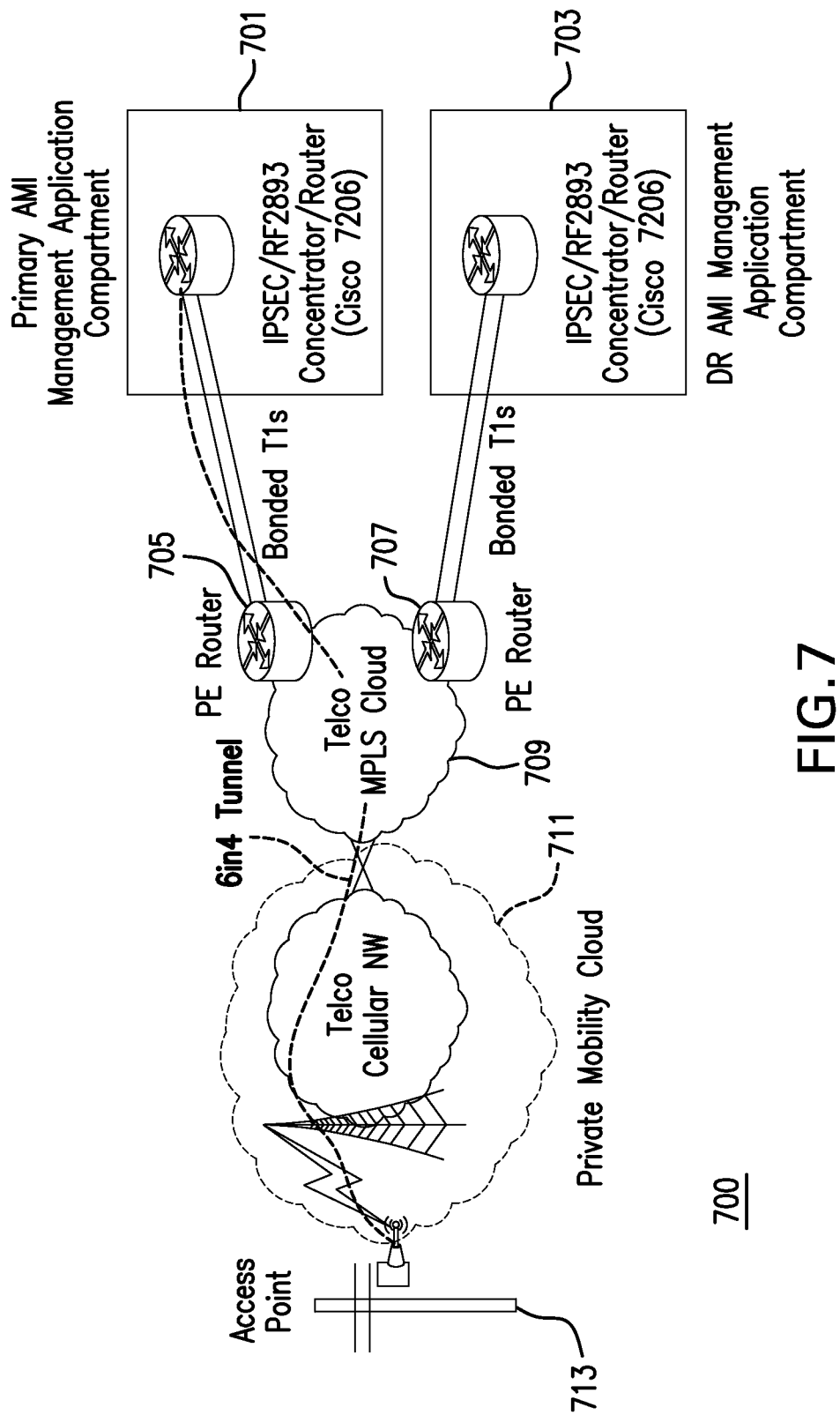
FIG. 7 shows a backhaul design under a private mobility cloud/MPLS/T1 setup, in accordance with one embodiment.

FIG. 7 shows the backhaul design 700 under the private mobility cloud/MPLS/Ethernet setup. The backhaul connection between AP modems 713 and the AMI management application VPN concentrator (e.g., 701 for a first AMI application compartment and 703 for a second compartment) may be implemented as a "private mobility" cloud 711. This is in contrast to other AP backhaul deployments where the AP modem interface sat on the Internet with a publically routable IP address. Under the private mobility design the AP modem address is a "public non-routable" address that is "private" to the mobility cloud and routable to the AMI command and control management application. This adds a layer of security to the meter WAN traffic. The routing is specified by the utility and controlled by the Telco. Border Gateway Protocol (BGP) routing is used and routes are advertised from the VPN concentrator. The transport from the AP to the VPN concentrator is implemented using MPLS 709 for WAN circuits and Ethernet for the local loop access. In addition, the 6in4 VPN tunnel may be established from each AP to the VPN concentrator which provides an extra layer of traffic security.

FIG. 7 also illustrates two compartments that run the AMI command and control management application. The first compartment 701 is used to run the primary AMI management application while compartment 703 is used to run the disaster recovery (DR) AMI management application. For security reasons, the first compartment may be deployed or implemented at a first utility location or facility (referred herein as the "GO" location) and the DR compartment may be deployed or implemented at a second utility location or facility (referred herein as the "JB" location).

The IPv4 addressing scheme maybe established by the utility since the utility may have to route traffic to from/the AMI command and control management application compartment. The vendor may review and approve the IPv4 scheme. The IPv4 addressing scheme may be implemented as a public non-routable Class B/19 per site under the utility's addressing scheme, 10.108.0.0/19 for the primary datacenter and 10.108.32.0/19 for the secondary datacenter. The scheme may use a non public non-routable IP prefixes as defined by RFC4193, which details the IP networking/VLAN requirements and the IPv4 addressing. The NAN IPv6 addressing maybe defined by RFC4193 with the understanding that meter traffic should not be publicly routable.

Figure 8:
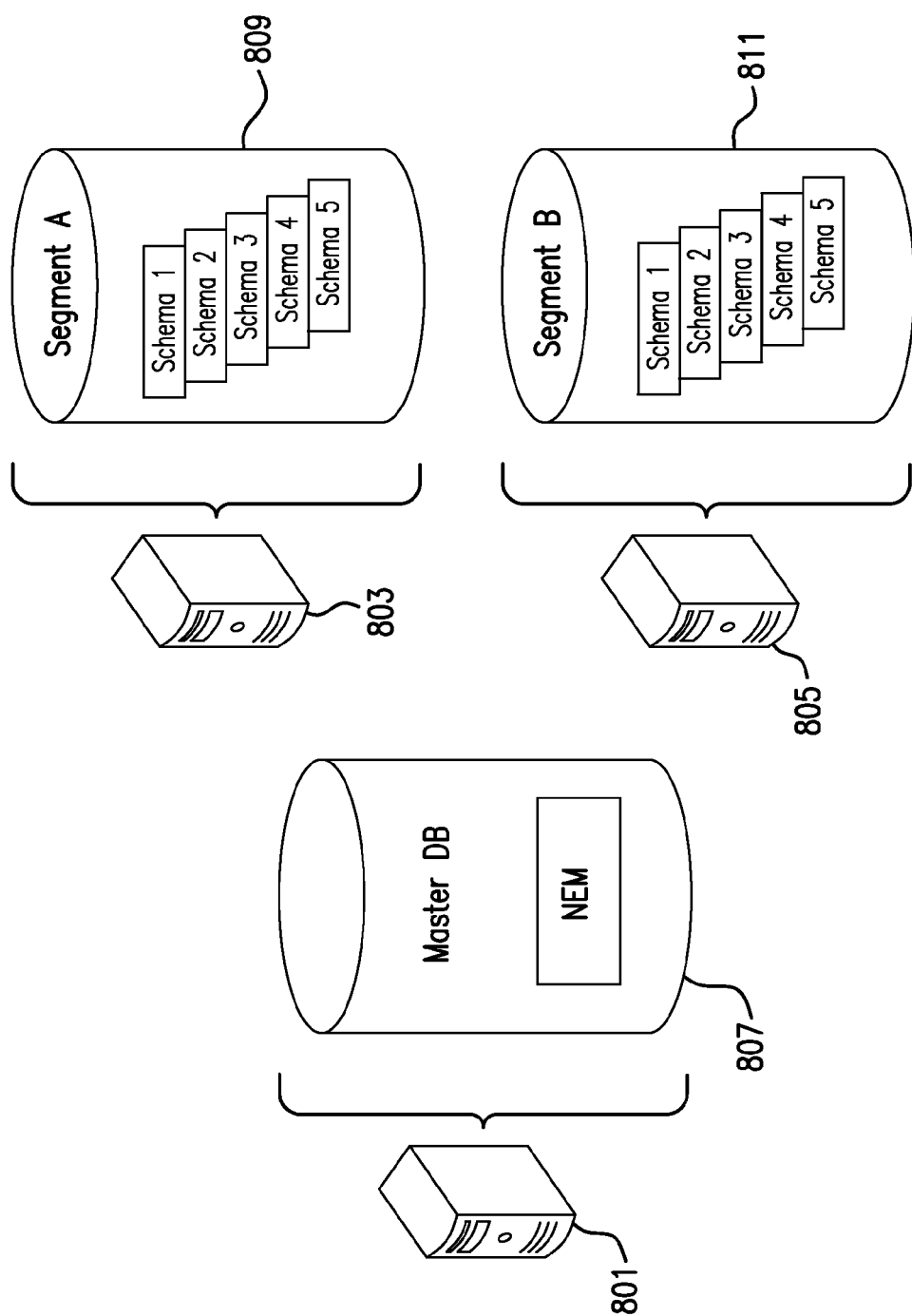
FIG. 8 shows a 5 MM meter database design in accordance with one embodiment.

The utility may use a 5 MM meter database design as shown in FIG. 8. The design contains one physical server 801 to house the master database 807 (including the Network Element Manager (NEM) data) and database servers 803 and 805 corresponding to separate segments 809 and 811 (e.g., segment A with schemas 1-5 and segment B with schemas 6-10). In a preferred embodiment, schemas are based on 500,000 meters, for a total of twelve schemas. Anything above 500,000 per segment has a potential to create concurrency issues and the performance may end up sub-optimal.

Figure 9:
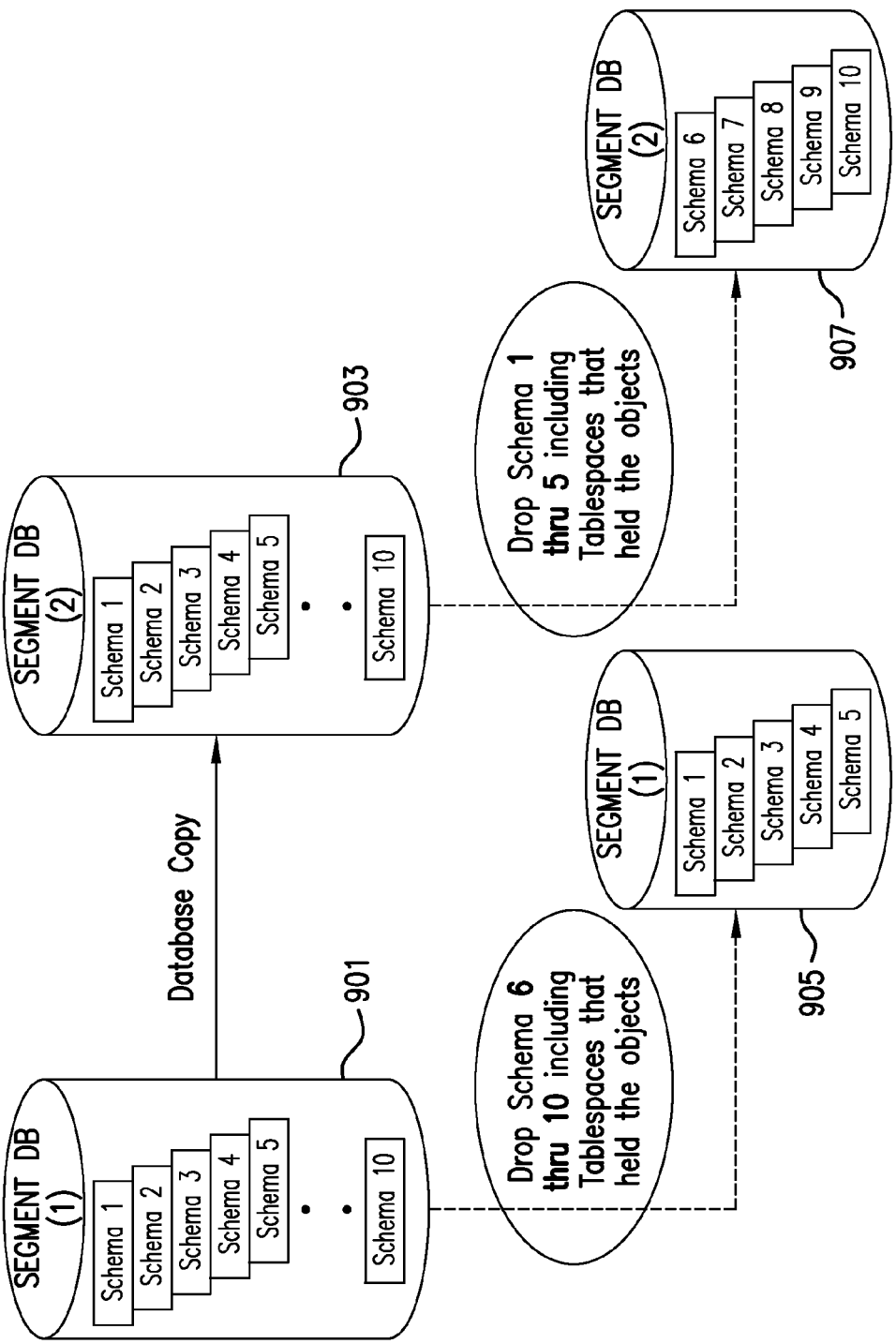
FIG. 9 shows the migration of schemas to a new segment database server in accordance with one embodiment.

FIG. 9 shows the migration of schemas to a new segment database server in accordance with one embodiment. Initial setup may start with one segment database 901. The database 901 may be configured with 10 schemas. Initially each schema may handle 5000 devices to start with, but as the system ramps up deployment of devices (e.g., meters) these schemas may take additional deployment load, balanced across 10 schemas. The maximum limit per schema may already be pre-determined at 500,000 per schema. Once total deployment size on one segment database reaches close to 2,000,000, another database server may be added and 5 schemas may be migrated to the new server.

The database 901 may be copied into a second database 903. Thereafter, database 901 may drop schemas 6 though 10 and database may drop schemas 1 though 5 so that each database has its own set of schemas.

In accordance with one embodiment, the AMI command and control management application may rely on Oracle 11 g Enterprise Edition (EE) and Oracle partitioning. Database (DB) replication to local and remote solutions may be implemented through SAN based technology that replicates a block level. This eliminates the need for Oracle based replication tools like Oracle DataGuard which require an additional expense on the replication host.

The DB and SYSLOG servers may require storage that is beyond the capacity and performance of local server storage. SAN based storage may be deployed to meet the capacity and performance requirements. In accordance with one embodiment, the utility may choose to use an existing shared SAN and leverage future SAN technologies. However, the utility may deploy separate AMI management application-only infrastructure in the shared SAN to ensure SLAs and minimize performance management issues. The solution of the present invention may include its own SAN switches (one per SAN fabric) implemented as blades in the enterprise SAN switch chassis and its own storage frame/ spindles. The AMI command and control management application SAN switches may have 16 ports each running at 4 GB/s.

In accordance with one embodiment, the AMI command and control management application equipment is not required to be deployed in general purpose datacenter racks. Separate equipment racks may be deployed in support of the physical separation and share nothing principles of the design. In addition, core network equipment may be separated from servers and edge switches to support modular growth and provide a clean cabling design. In one embodiment two network racks and three server racks may be deployed to support the equipment counts and some future growth. The network rack cabling supports the addition of 3 additional server racks. An additional rack space may be used for the EMC CX480 storage frame. A location maybe selected at each datacenter that could support a minimum of six (6) cabinets and future AMI application expansion of additional more server cabinets in one row.

Each server rack may have an Access and OOB switch. Each server in the cabinet may plug directly into these edge switches. Edge switches may be uplinked to the 3750G router core through Panduit QuickNet structured cabling, for example. The structured cabling interconnects devices between the cabinets.

The AMI command and control management application may receive meter and premise changes from the Customer Information System (CIS) system through an enterprise application integration (EAI) layer. Messages may first be sent to EAI where they are transformed/processed into communications the AMI management application can process. EAI then sends the messages to the AMM mid-tier server in the AMI management application. The connection from EAI to the AMI management application may be implemented as a web services connection using TLS 1/Ethernet.

There may be one production EAI server in the GO for AMI management application and one DR server in JB. The production server accesses the production AMI management application AMM mid-tier server through a DNS alias on a specific port. In the event that the AMI management application needs to move to DR, the vendor may change the production alias to point to the DR AMM mid-tier server. If EAI needs to move to DR and AMI management application does not, The EAI server will be pointed to the production AMM alias. Preferably, in all scenarios the AMI management application AMM production alias will be used.

The AMI management application web services may require TLS connections with the minimum of server side authentication, also referred to as unilateral authentication. In server side authentication, the client (EAI) authenticates the web service server (AMM mid-tier) by verifying that the server's TLS certificate is signed by a trusted host. To achieve this, the client may require the public certificate of the signer. The signer can be an Internet public certificate authority (CA) like VeriSign or a local private CA, like domain controllers. For the initial AMI management application hosted deployment, the utility may choose internal CAs to reduce deployment time and cost. A general purpose wild card certificate may be created for the AMI management application that can be used on multiple servers.

Existing vendor AMI management applications may rely on an open source system monitoring application that watches hosts and services and notifies support groups when states change. The open source application (e.g., NAGIOS) may support many device types and products, and can be agent or agent-less. It is very similar to the standard monitoring tools from Tivoli for example. NAGIOS monitors can be aggregated on a central server and alerts forwarded to other NAGIOS servers to form a robust and flexible monitoring system.

The present invention may also rely on SYSLOG, an industry standard message logging tool that provides centralized message aggregation. Like NAGIOS, SYSLOG servers can be setup to forward to other SYSLOG servers to form hierarchical message capture and storage systems.

Figure 10:
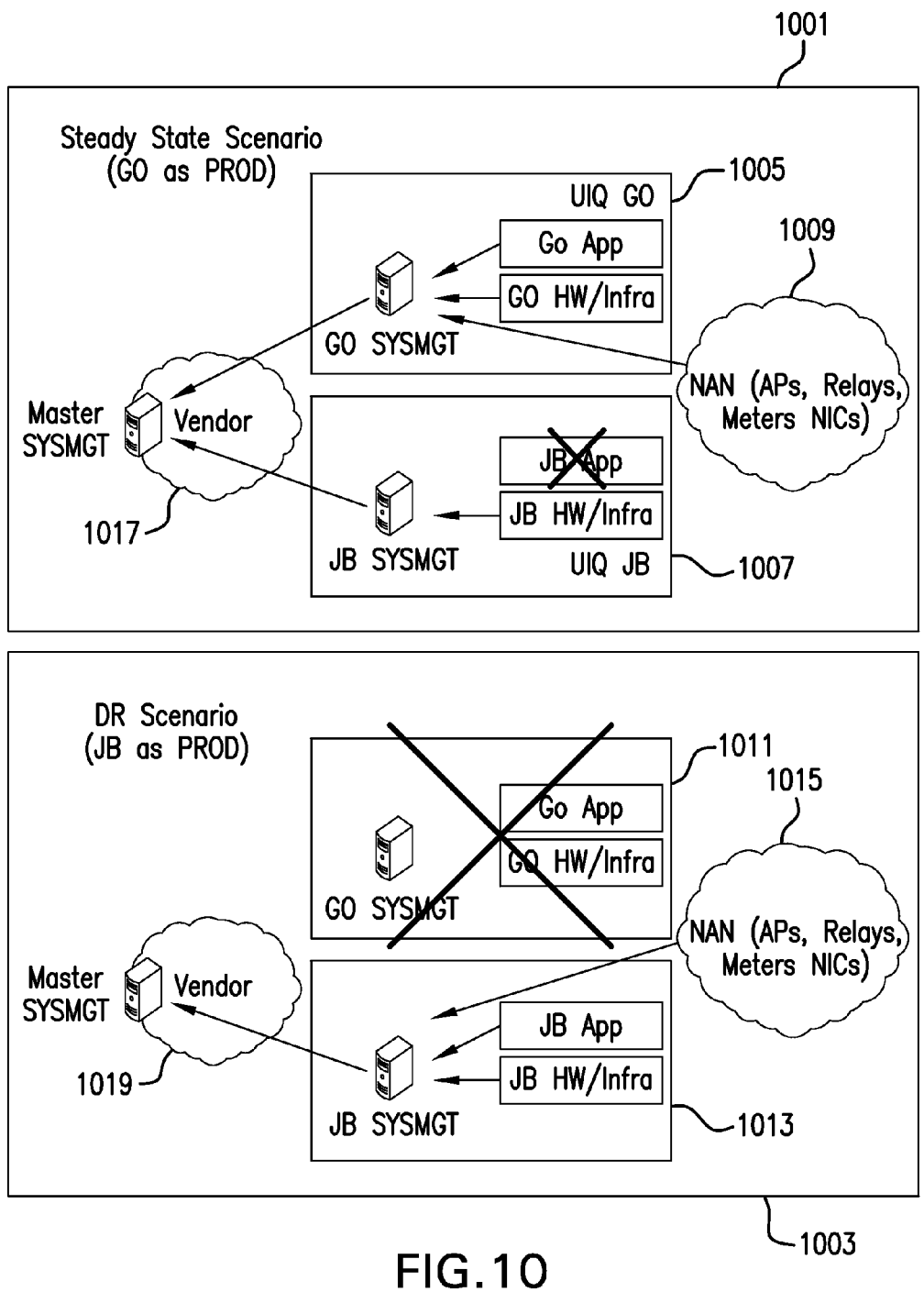
FIG. 10 shows the monitoring and logging architecture for steady state and disaster recovery (DR) scenarios in accordance with one embodiment.
Figure 11D:
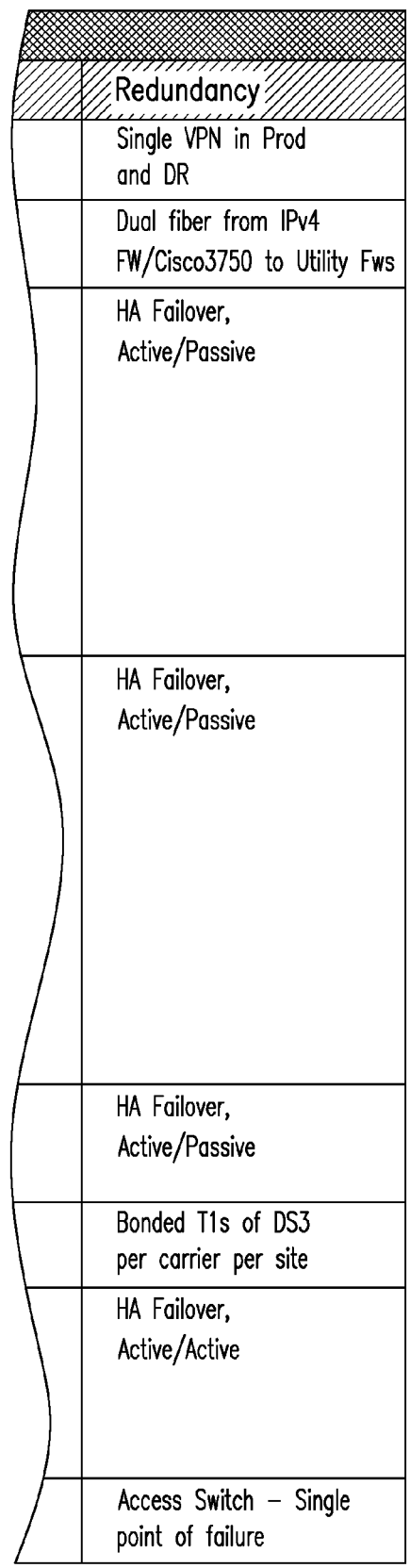

FIG. 10 shows the monitoring and logging architecture for steady state and DR scenarios. "Local" tools servers may be deployed in each AMI management applications compartment (1001 and 1003) as the initial aggregation point for monitoring and logging. Monitor results and SYSLOG messages may then be forwarded to master servers 1017 and 1019 at the vendor datacenter. Management of alerts/messages and notification may be done from the master servers. This creates a flexible and loosely coupled system which facilitates disaster recovery (DR), reduces firewall rules administration, and ensures that the capture of critical alerts and message are not impacted by VPN outages.

Preferably, each server is responsible for monitoring and logging the local components in its compartment. For instance, a GO NAGIOS server monitors the GO components 1005 and the JB NAGIOS server monitors the JB compartments (1007, 1013). The AMI network and its components may be monitored and logged from the GO tools servers since the GO is the steady state production compartment 1001. In a DR scenario where the GO compartment is not available (1011), the JB tools servers become the production tools servers and the AMI network is monitored and logged from the JB tools servers. History of GO alerts and message is retained vendor master aggregation server at the vendor site.

The data requirements and daily data change rates for AMI management applications at a 2 MM meter scale may present a challenge to traditional backup and restore technologies. EMC RecoverPoint maybe used in one embodiment. EMC RecoverPoint has two major configurations: Continuous Data Protection (CDP) and Continuous Remote Replication (CRR). CDP allows independent local data recovery and CRR provides offsite replication and recovery (DR). RecoverPoint is a SAN based technology that records each write from "source LUNs" to separate "target LUNs" and keeps a "journal" of changes. With the target LUNs and the journal, RecoverPoint can recreate an image of the LUNs at any time in the past. At a high-level, RecoverPoint rolls back the changes on the target LUNs using the changes recorded in the journal. The journal is a rolling buffer of changes so recovery can be performed up to the earliest change recorded in the journal. Therefore the roll back period is dictated by the size of the journal space and the data change rate. Both configurations require separate target LUNs and journals.

In one embodiment, the hosted solution of the present inventor may be configured with both CDP and CRR. To meet business requirements for 30 days of backups, the journal size may be set to 6 TB (200 GB/day×30 days=6000 GB) for both configurations. CDP LUNs and journal are implemented on the same SAN frame as the production LUNs. Replication from the source prod LUNs to the DR LUNs may be accomplished using IMO's shared replication WAN links and infrastructure. Data is automatically backed up at two locations as it's written to the SAN. Other than journal space monitoring, no period actions are needed to create and/or manage backups.

For any recovery scenarios not covered under the RecoverPoint design, e.g., a total loss of data at both sites, a primary recovery goal is to obtain register reads and export register data for billing. Meter interval data may also be kept in the vendor's Network Interface Card (NIC) for multiple days so it can be retrieved once an initial DB instance is brought up. For these scenarios, the vendor may bring up a clean instance of the DB and load the data needed to initiate register reads and export register values to the MDM. The load files maybe generated and created by the vendor's Customer Service.

In one embodiment, vendor users are required to login to a VPN concentrator to access the utility compartments. Vendor users can access these concentrators from the Internet or internally. To login the vendor may use a browser and SSL connection to access the VPN. An ActiveX component or similar application is downloaded and installed. This application is an IPsec client and alters the IP stack. At login the user provides a VPN profile and a second authentication factor based on RSA SecureID hardware tokens. The VPN profile is specific to the utility and only allows access to utility resources. The VPN device may then provide an IP address from its VPN pool. At this point the VPN may only allow the client to access the AMI management applications hosted by the utility in a network compartment and a limited amount of vendor side resources, such as email and a "remedy" ticket system. Internet access or "split tunneling" may specifically be denied. Once connected, the client can then use the common access protocols and tools (SSH, HTTPS, etc.) to access the various authentication domains. Access logging may be performed at the VPN device, the vendor RSA infrastructure, the utility side FW or the target device in the AMI management applications compartment.

The various embodiments and/or components, for example, the modules, elements, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), field-programmable gate arrays (FPGAs), graphical processing units (GPUs), logic circuits, and any other circuit or processor capable of executing the functions described herein. The above examples are exemplary only, and are thus not intended to limit in any way the definition and/or meaning of the term "computer."

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software", "firmware" and "algorithm" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions, types of materials and coatings described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A system for maintaining and hosting an AMI command and control application comprising:
   the AMI command and control application running in a processor in a first network compartment for measuring energy usage from customer meters, managing an AMI network, and executing connect/disconnect orders, the AMI command and control application being directly connected to a first sub-network within a utility's internal network, and the AMI command and control application is provided by an external vendor;
   a second sub-network within the utility's internal network, the second sub-network comprising message logging and data storage systems;
   a first firewall to provide direct connections with restricted communications between the first sub-network and the second sub-network;
   a second firewall to provide restricted connections between the first sub-network and a public data communications network, the second firewall providing a restricted vendor communications path through the public data communications network to a first remote device on a vendor network of the external vendor, where the restricted vendor communications path operates to allow the first remote device on the vendor network to manage the AMI command and control application; and
   a VPN concentrator an a 6in4 router to provide restricted communications between the AMI command and control application and the AMI network when said application is accessed by a second remote device on the AMI network,
   wherein remote access to the AMI command and control application from the AMI network is independent regulated by the VPN concentrator and the 6in4 router such that access to the AMI command and control application is restricted as a function of a network domain from which the first remote device or the second remote device attempts access,
   a second AMI command and control application running in a processor in a second network compartment at a disaster recovery facility for measuring energy usage from the customer meters, managing the AMI network, and executing the connect/disconnect orders;
   a second plurality of firewalls to provide a first additional security perimeter between the second AMI command and control application and the vendor network or the utility's internal network when said second AMI command and control application is accessed by the first remote device; and
   a second VPN concentrator and a second 6in4 router to provide a second additional security perimeter between the second AMI command and control application and the AMI network when said second AMI command and control application is accessed by the second remote device,
   wherein said first network compartment comprises a production server configured to monitor and log operations of components in the first network compartment to an aggregation server on the vendor network, and
   said second network compartment includes a disaster recovery server configured to monitor and log operations of components in the second network compartment to the aggregation server on the vendor network, and
   wherein the aggregation server maintains a journal of changes made in the production server and the disaster recovery server and supports recreating, in at least one of the production server and the disaster recovery server, a prior data storage image from within a preceding time range, where the preceding time range is based upon a size of the journal and a data change rate of the changes.

2. The system of claim 1, wherein network layers 2 and 3 are configured to provide a logical security perimeter between said AMI command and control application module and the vendor network.

3. The system of claim 1, wherein the first network compartment further comprises a Virtual Local Area network hosting component having an IPv6 connection to meters.

4. The system of claim 3, wherein said component comprises:
   an advanced metering manager middle tier application running in a processor for accepting commands from users and placing the commands in a queue;
   an advanced metering manager generic meter reader application running in a processor for receiving said requests and sending them to the meters for execution;
   a firmware updater application running in a processor and a meter program configurator application running in a processor to directly update software and configuration settings on meters; and
   a network element manager application running in a processor for collecting statistics regarding the network operation of each end point.

5. The system of claim 1, wherein a combination of the first firewall and the second firewall do not allow direct communications between back offices systems or users in the utility's internal network and meters in the AMI network.

6. The system of claim 1, wherein said first firewall and said second firewall comprise a pair of utility managed firewalls to border said first network compartment by segregating the first network compartment from the utility's internal network and the vendor network.

7. The system of claim 6, further comprising an interface to at least one of said utility managed firewalls to allow communication with the vendor network via an IPv4 connection.

8. The system of claim 6, wherein said utility managed firewalls are set up in an active/passive cluster.

9. The system of claim 6, further comprising an interface to at least one of said utility managed firewalls to allow communications with the utility's internal network via a physical link.

10. The system of claim 1, wherein said first network compartment comprises at least one core routing switch, at least one access switch, and at least one out of band switch.

11. The system of claim 10, wherein said first network compartment comprises a plurality of core switches that define and control a virtual area network within the first network compartment and that define various network segments.

12. The system of claim 1, wherein the production server accesses a production advanced metering manager middle tier server though a DNS alias on a specific port, and in a disaster recover scenario, a production alias is changed to point to a disaster recovery advanced metering middle tier server.

13. A system for maintaining and hosting an AMI command and control application comprising:
- a server in a network compartment for measuring energy usage from customer meters, managing an AMI network and executing connect/disconnect orders, the server comprising the AMI command and control application directly connected to a first sub-network within a utility's internal network, and the AMI command and control application is provided by an external vendor;
- a second sub-network within the utility's internal network, the second sub-network comprising message logging and data storage systems;
- a plurality of firewalls to provide a security perimeter to the server when the server is accessed by a first remote device on a vendor network or a device on the second sub-network, the plurality of firewalls comprising:
  - a first firewall to provide direct connections with restricted communications between the first sub-network and the second sub-network; and
  - a second firewall to provide restricted connections between the first sub-network and a public data communications network, the second firewall providing a restricted vendor communications path through the public data communications network to the first remote device on the vendor network of the external vendor, where the restricted vendor communications path operates to allow the first remote device on the vendor network to manage the AMI command and control application; and
- a VPN concentrator and a 6in4 router to provide the security perimeter to the server when said server is accessed by a second remote device on the AMI network
- a second server in a second network compartment at a disaster recovery facility for measuring energy usage from customer meters, managing the AMI network, and executing connect/disconnect orders, the second server comprising a second AMI command and control application;
- a second plurality of firewalls to provide a first additional security perimeter between the second server and the vendor network or the utility's internal network when said second AMI command and control application is accessed by the first remote device; and
- a second VPN concentrator and a second 6in4 router to provide a second additional security perimeter to the second server when said second server is accessed by the second remote device, wherein access to the AMI command and control application is restricted as a function of a network domain from which the first remote device or the second remote device attempts access, wherein said network compartment comprises a production server configured to monitor and log operations of components in the network compartment to an aggregation server on the vendor network, and said second network compartment comprises a disaster recovery server configured to monitor and log operations of components in the second network compartment to the aggregation server on the vendor network, and wherein the aggregation server maintains a journal of changes made in the production server and the disaster recovery server and supports recreating, in at least one of the production server and the disaster recovery server, a prior data storage image from within a preceding time range, where the preceding time range is based upon a size of the journal and a data change rate of the changes.

14. The system of claim 13, wherein network layers 2 and 3 are configured to provide a logical security perimeter between said AMI command and control application module and the vendor network.

15. The system of claim 13, wherein the network compartment further comprises a Virtual Local Area network hosting component having an IPv6 connection to meters.

16. The system of claim 15, wherein said component comprises:
- an advanced metering manager middle tier application running in a processor for accepting commands from users and placing the commands in a queue;
- an advanced metering manager generic meter reader application running in a processor for receiving said requests and sending them to the meters for execution;
- a firmware updater application running in a processor and a meter program configurator application running in a processor to directly update software and configuration settings on meters; and
- a network element manager application running in a processor for collecting statistics regarding the network operation of each end point.

17. A method for maintaining and hosting an AMI command and control application comprising:
- providing a server in a network compartment for measuring energy usage from customer meters, managing an AMI network and executing connect/disconnect orders, the server comprising an AMI command and control application directly connected to a first sub-network within a utility's internal network, and the AMI command and control application is provided by an external vendor;
- providing a second sub-network within the utility's internal network, the second sub-network comprising message logging and data storage systems;
- providing a plurality of firewalls to provide a first security perimeter to the server when the server is accessed by a first remote device on a vendor network or by a device on the second sub-network, the plurality of firewalls comprising:

a first firewall to provide direct connections with restricted communications between the first sub-network and the second sub-network; and a second firewall to provide restricted connections between the first sub-network and a public data communications network, the second firewall providing a restricted vendor communications path through the public data communications network to the first remote device on the vendor network of the external vendor, where the restricted vendor communications path operates to allow the first remote device on the vendor network to manage the AMI command and control application;

providing a VPN concentrator and a 6in4 router to provide a second security perimeter to the server when said server is accessed by a second remote device on the AMI network;

selectively regulating access to the AMI command and control application as a function of a network domain from which the first remote device or the second remote device attempts access, providing a second AMI command and control application running in a processor in a second network compartment at a disaster recovery facility for measuring energy usage from the customer meters, managing the AMI network, and executing the connect/disconnect orders;

providing a second plurality of firewalls to provide a first additional security perimeter between the second AMI command and control application and the vendor network or the utility's internal network when said second AMI command and control application is accessed by the first remote device;

providing a second VPN concentrator and a second 6in4 router to provide a second additional security perimeter between the second AMI command and control application and the AMI network when said second AMI command and control application is accessed by the second remote device; and wherein said network compartment comprises a production server configured to monitor and log operations of components in the network compartment to an aggregation server on the vendor network, and said second network compartment includes a disaster recovery server configured to monitor and log operations of components in the second network compartment to the aggregation server on the vendor network, and wherein the aggregation server maintains a journal of changes made in the production server and the disaster recovery server and supports recreating, in at least one of the production server and the disaster recovery server, a prior data storage image from within a preceding time range, where the preceding time range is based upon a size of the journal and a data change rate of the changes.

18. The system of claim 1, wherein the AMI command and control application operates to store data on a Storage Area Network that is shared with other processes on the utility's internal network.

* * * * *